Patented Nov. 1, 1932

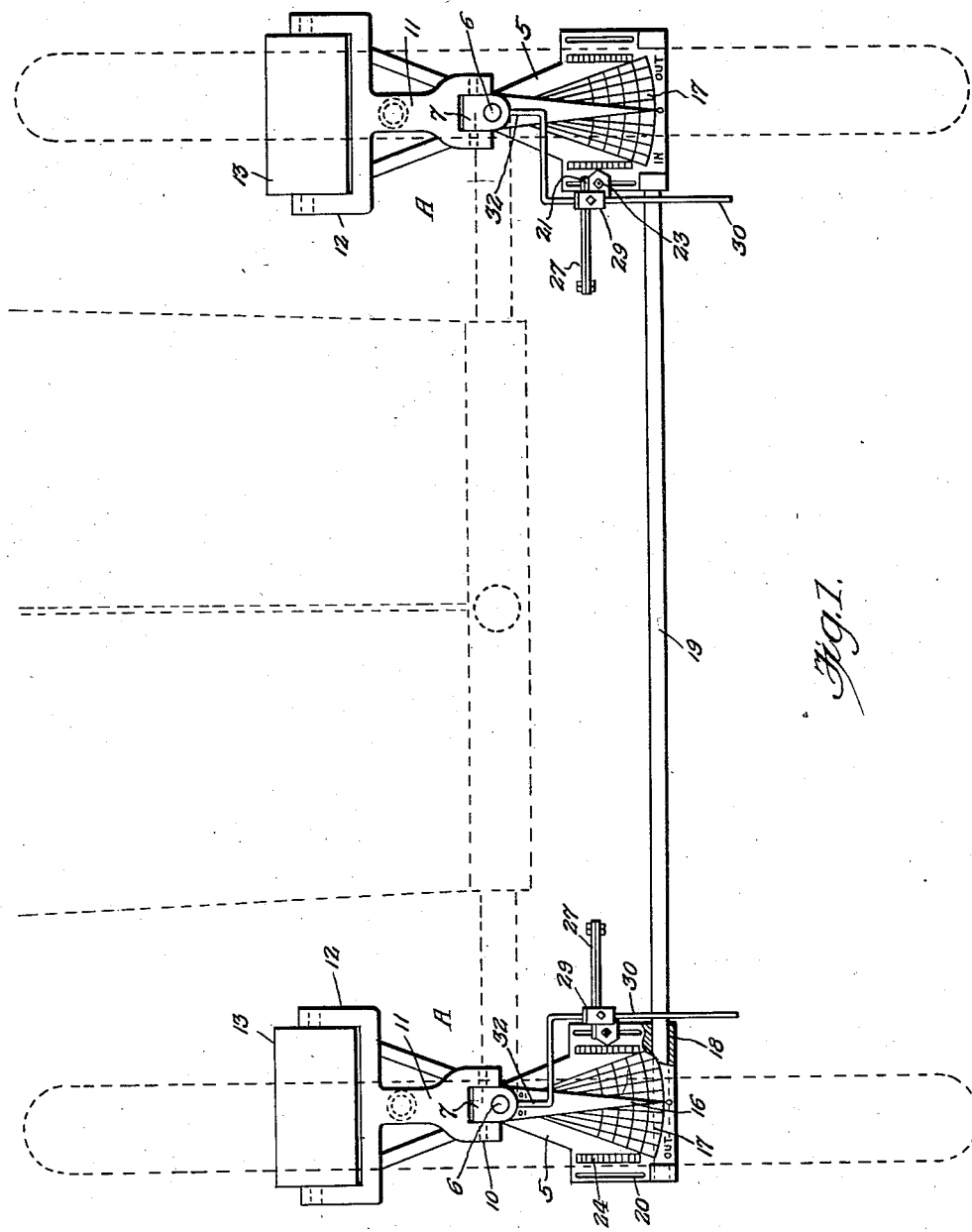

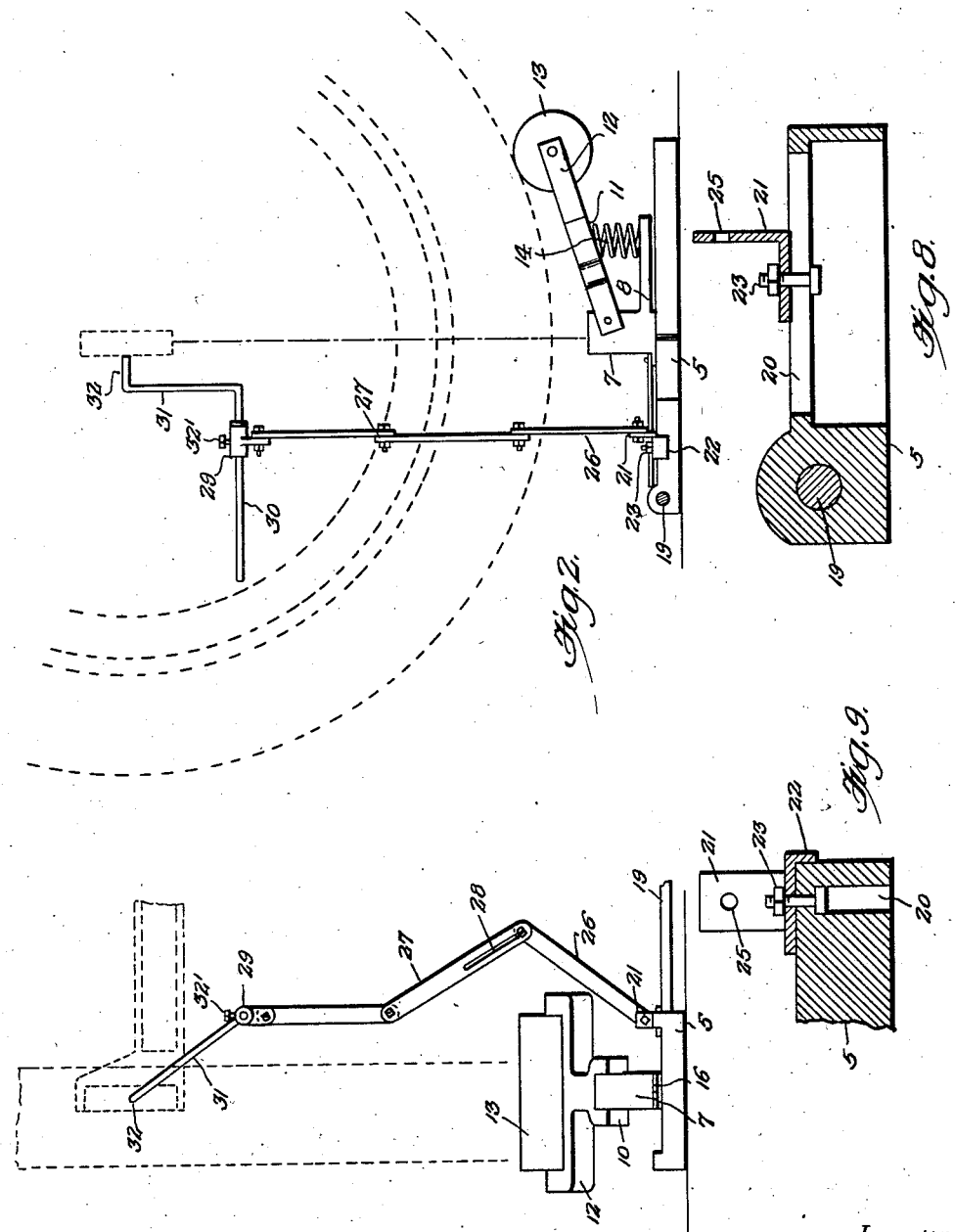

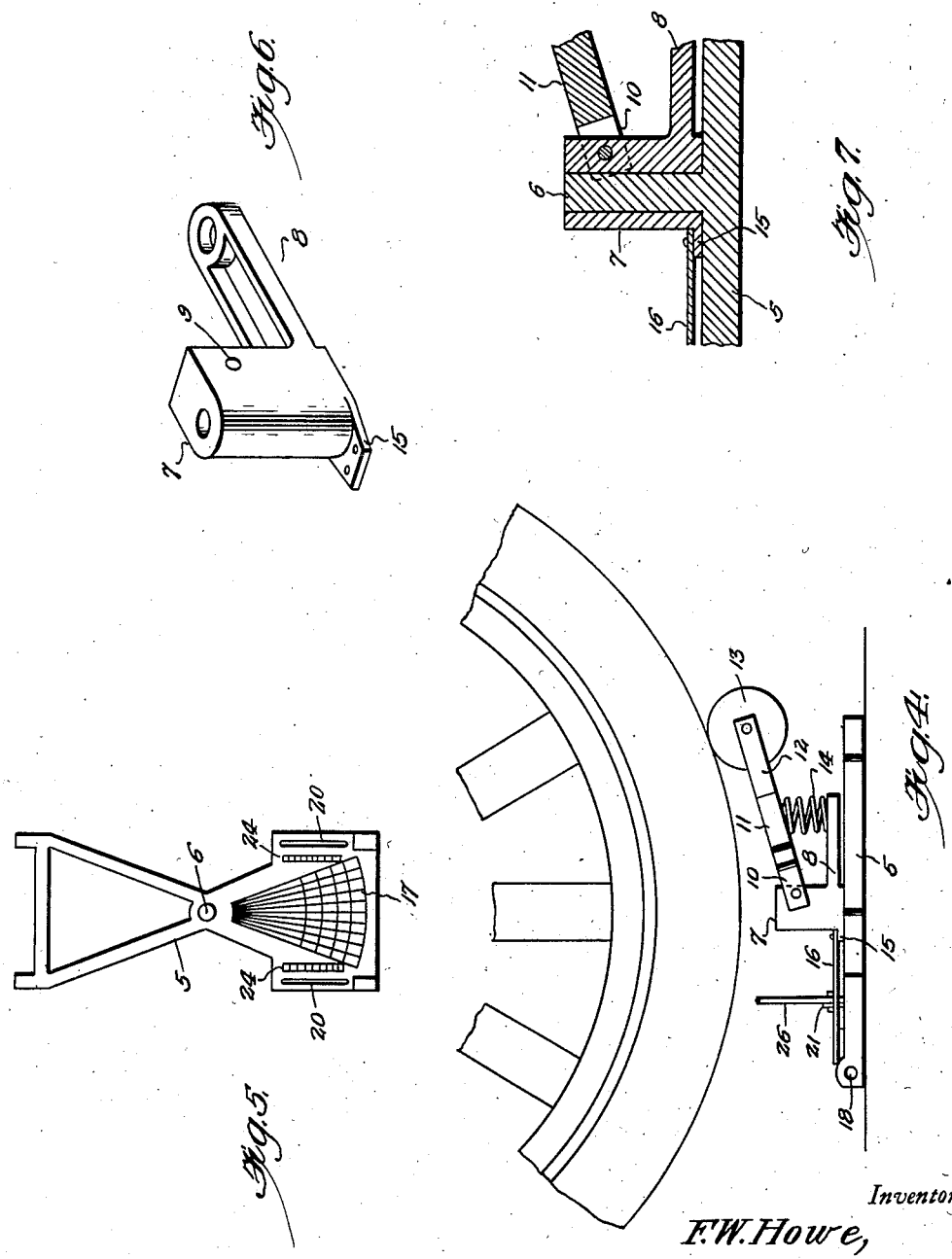

1,886,019

UNITED STATES PATENT OFFICE

FRANK W. HOWE, OF SIDNEY, NEW YORK, ASSIGNOR, BY MESNE ASSIGNMENTS, TO CLYDE H. PHELPS, OF MOUNT VERNON, NEW YORK

AUTOMOBILE WHEEL ALIGNING DEVICE

Application filed January 28, 1928. Serial No. 250,209.

This invention relates to new and useful improvements in devices for facilitating the proper alignment of the front or rear wheels of an automobile and to more particularly facilitate the adjustment of the wheels so that the proper degree of "toe-in" or "toe-out" may be provided.

It is well known that the front wheels of automobiles when not running in perfect alignment will cause excessive wear on the tires, hard steering of the machine, and oftentimes the trembling of the entire front of the automobile, commonly called shimmey which sometimes results in serious wrecks or accidents.

Furthermore when the front wheels are not in proper alignment the result is an excessive wear and uneven scrubbing of the tires by scalloping or cupping out the rubber of the tire threads in deep cup like shape at various points upon the tread.

Through the medium of the present invention such disalignment of the wheels may be readily and accurately corrected.

Generally the invention consists of a pair of similarly constructed units interconnected in spaced parallel relation equivalent to the spaced relation between the front or rear wheels of an automobile, each unit consisting of a base member or casting to which is pivoted for horizontal swinging movement a tire tread engaging roller so that when the wheel is rotated, manually or otherwise, the roller will swing upon its axis and move a cooperating pointer which discloses readily if the wheels are in or out of alignment.

In order that the proper indications will result it is necessary that the rollers of the units be arranged in back of the vertical axes of the wheels and that the pivot points of the rollers be arranged in vertical alignment with said vertical axes.

A further and most important object of this invention is to provide means in association with the aligning mechanism to bring about the proper location of the aligning mechanism in position beneath the wheels of the machine when the car is raised.

A further and quite important object of this invention resides in the provision of an aligning mechanism for vehicle wheels wherein the disalignment of the wheels may be readily determined for correction, and this regardless of the diameter of the wheels.

A final salient object of this invention is to provide a combined aligning and locating device that is unusually simple in construction and inexpensive of manufacture and one that may be employed for the purposes intended without requiring any unusual skill upon the part of the operator.

With the foregoing and other objects in view as the nature of the invention will be better understood, the same comprises the novel form, combination and arrangement of parts hereinafter more fully described, shown in the accompanying drawings and defined in the claims.

In the drawings, wherein like reference characters indicate corresponding parts throughout the several views:

Figure 1 is a top plan view of the complete device, the front wheels of an automobile being disclosed in dotted lines as arranged thereon.

Figure 2 is an inner side elevation of one of the units of the device as arranged beneath a wheel disclosed in dotted lines.

Figure 3 is a front end elevation of one of the units.

Figure 4 is an outer edge elevation of one of the units arranged beneath a wheel, the locating device for the unit being broken away.

Figure 5 is a plan view of the base member or casting of one of the units.

Figure 6 is a perspective view of the tire tread engaging roller carrying member mounted for horizontal swinging movement upon the base member or casting.

Figure 7 is a fragmentary section through the base member or casting and the roller carrying unit pivotally arranged thereon.

Figure 8 is a detailed longitudinal section through one longitudinal edge of the base member or casting, at the forward end thereof for disclosing more clearly the attaching bracket for its complemental locating device, and Figure 9 is a fragmentary transverse section therethrough.

Now having particular reference to the drawings, my novel device consists of a pair of similarly constructed units designated generally by the reference characters A—A. Each unit consists of a base member 5 in the form of a metallic casting of somewhat elongated formation and preferably of the design as disclosed in Figure 5. However, it is not absolutely necessary that these base members be of the design illustrated for the reason that various designs can be had without affecting the spirit or scope of the present invention. Intermediate the ends of each casting 5 the same is formed with a vertical pivot pin 6, while adapted for loose disposition upon said pin is a collar 7 formed at its lower end and rear edge with a rearwardly extending arm 8, said arm and collar being formed as a single unit preferably through a casting operation. As more clearly disclosed in Figure 6 the lower surface of the arm 8 is located above the lower end of the collar 7 so that the collar only will have bearing upon the base casting 5.

Directly in back of the vertical pin bore of said collar 7 there is formed a cross bore 9 to facilitate the pivotal attachment of the inner forked end 10 of an arm casting 11, the rear end of which is formed with a relatively wide fork 12 between the legs of which is mounted for rotation a roller 13.

Arranged between the rear end of the collar arm 8 and the arm casting 11 inwardly of the fork 12 is an expansible coil spring 14 for the purpose of normally urging the roller carrying arm in an upward direction.

At the forward edge of the collar 7 the same is formed at its lower end with a longitudinally projecting tongue 15 to which is rigidly secured the inner end of a pointer 16 while within the normal radius of the swinging movement of said pointer the said base 5 is provided with a properly calibrated scale 17.

Each casting 5 is formed at its forward edge with a cross bore 18 whereby the opposite ends of a tie rod 19 may have a sliding fit therein so that the units may be arranged in predetermined spaced relation substantially equivalent to the spaced relation between the complemental wheels to be aligned.

In actual practice, the front or rear end of the vehicle, depending upon which pair of wheels are to be tested for proper alignment, is jacked up for a predetermined extent and the device arranged so that the units A—A will be disposed in position beneath said wheels. Proper results can be had, however, only when the pivot points of the collars 7 of said units are arranged in vertical alignment with the wheel spindle knuckles, as disclosed in Figure 2, whereupon the rollers 13 of the unit will be arranged in back of the vertical axes with the result that when said rollers frictionally engage the tire tread this will under the laws of physics cause the said rollers to exactly parallel the axes of said wheels resulting in the turning of the roller arm and consequently the collars upon their pivot pins and a resultant movement of the pointers 16. In order to attain this turning movement it is of course necessary that said wheels be rotated. Obviously the position of the pointers with respect to the scales 17 will indicate the degree of "toe-in" or "toe-out," after which the proper alignment of the wheels may be brought about by the lengthening or shortening of the automobile tie rod between the wheels.

It is preferable in the proper use of the aligning device to move the left wheel of the machine to a true aligned position, this true alignment being indicated by the particular pointer of that unit being at the zero point of the scale 17. The left wheel is mentioned for the reason that usually the left wheel is directly associated with the vehicle steering mechanism. However, in the event the machine is constructed with a right hand drive, the right hand wheel should be moved into true alignment. The combined misalignment of the two wheels will then be registered upon the scale of the other unit so that both wheels may be adjusted into true alignment or into the proper "toe-in" or "toe-out."

In order to facilitate the proper location of the units beneath the wheels, each unit is equipped with a similarly constructed locating device.

In order to permit of the attachment of the locating devices to the units, the opposite longitudinal edges of each base member, at the forward end thereof, are formed with longitudinal slots 20—20, these slots at opposite edges being provided so that each unit may be arranged at either end of the interconnecting tie rod 19. However, in actual practice it may be desirable to provide these slots only at the inner edges of the casting. Arranged upon the inner edge of each base casing 5 is an L-shaped bracket 21, the outer edge of the longitudinal portion thereof being formed with a down turned flange 22 for engagement along the outer edge of the casting as disclosed in Figure 9 to prevent the turning of the bracket upon said casting. Said bracket is longitudinally adjustably connected to the base casting by suitable bolt and nut connection 23 passing through the slot 20 and an opening in the said longitudinal portion of the bracket, see Figure 9. In order to determine the correct position of the bracket upon the casting, the face of the casting at the inner sides of said slots 20—20 is longitudinally scaled as at 24—24, to cooperate with the inner pointed edge of the bracket, as will be understood upon reference to Fig. 1. Adjacent the upper end of the vertical portion of said bracket 21 there is formed an opening 25 to facilitate the pivotal attachment of an elongated link member 26 thereto, while extending from the other end of this link member and being pivotally interconnected at adjacent ends are other link members 27, at least one of which is provided adjacent one end with a slot 28 whereby the length of the arm formed by said links may be lengthened or shortened. Pivoted to the end of the uppermost link 27 is a longitudinally extending collar 29 which is longitudinally slidable and rotatable on an elongated pin or bar 30 the inner end of which is bent at right angles thereto as at 31, while the extreme outer end of this right angularly bent portion is provided with a longitudinally extending spindle knuckle feeler tip 32. After the proper adjustment of this feeler tip has been made, its longitudinal carrying pin 30 may be locked in the collar 39 by a clamp or set screw 32'.

Prior to the disposition of the entire mechanism beneath the automobile wheels, the locating devices are adjusted by simple calculations so that when the feeler tips 32 encounter the spindle knuckles of the axles as disclosed in Figures 2 and 3, the pivotal axes of the rollers 13 will be located in true vertical alignment with said wheel axles as in Figure 2 so that the turning of the wheels will cause the rollers to move parallel to the axes of the wheels.

In view of the foregoing description when considered in conjunction with the accompanying drawings, it will be readily apparent to those skilled in the art that I have provided a highly novel, simple and extremely efficient and serviceable aligning device for vehicle wheels together with means for properly locating the device in position beneath the wheels, and even though I have herein shown and described the invention as consisting of certain detail structural elements it is nevertheless to be understood that some changes may be made therein without departing from the spirit and scope of the appended claims.

Having thus described the invention, what I claim as new and desire to secure by Letters Patent is:—

1. In a wheel aligning device of the class described, a pair of units adapted to be arranged in spaced parallel relation substantially equivalent to the spaced relation of a pair of complemental vehicle wheels to be aligned, each unit comprising a base adapted for arrangement beneath the wheel, and an elongated member pivoted to the base for horizontal swinging movement thereon and having a part removed longitudinally of the member from the axis of the latter, and adapted to frictionally engage the vehicle wheel, whereby when the wheel is revolved, the member will be turned so that its longitudinal axis will be parallel to the medial plane of the wheel.

2. In a wheel aligning device of the class described, a unit adapted to be arranged beneath one of the wheels to be aligned when the same is in a raised position, said unit comprising a base, an elongated member pivoted on the base for horizontal swinging movement, and having a part removed longitudinally of the member from the axis of the latter and adapted to frictionally engage the vehicle wheel whereby, when the wheel is revolved, the member will be turned, so that its longitudinal axis will be parallel to the medial plane of the wheel, and a pointer carried by the horizontally swinging member for indicating the degree of its turning movement with respect to the base.

3. In a wheel aligning device of the class described, a unit adapted to be arranged beneath one of the wheels to be aligned when the same is in a raised position, said unit comprising a base, an elongated member pivoted on the base for horizontal swinging movement, and having a part removed longitudinally of the member from the axis of the latter and adapted to frictionally engage the vehicle wheel, whereby when the wheel is revolved, the member will be turned so that its longitudinal axis will be parallel to the medial plane of the wheel, and means associated with the base for locating the pivotal point between the base and the pivoted member directly beneath the steering axis of the wheel.

4. In a wheel aligning device of the character described, a unit adapted to be arranged beneath the wheel to be aligned when the same is raised, said unit comprising a base, an elongated arm pivoted on the base for horizontal swinging movement, a roller carried by the arm and adapted to frictionally engage the vehicle wheel, spring means for normally urging said roller into frictional engagement with the vehicle wheel, so that said arm will be turned upon rotation of the wheel so that the longitudinal axis of the arm will be parallel to the medial plane of the wheel, and means associated with the base whereby the pivot between the arm and the base may be located directly beneath the steering axis of the wheel.

5. In a wheel aligning device of the class described, a unit adapted to be arranged beneath one of the wheels to be aligned when the same is in a raised position, said unit comprising a base, an elongated member pivoted on the base for horizontal swinging movement and having a part removed longitudinally of the member from the axis of the latter and adapted to frictionally engage the vehicle wheel, whereby when the wheel is revolved, the member will be turned so that its longitudinal axis will be parallel to the medial plane of the wheel, means associated with the base for locating the pivotal point between the base and the pivoted member directly beneath the steering axis of the wheel, and a pointer carried by the horizontally swinging member for indicating the degree of pivotal movement of the member with respect to the base.

6. In a wheel aligning device of the class described, a unit adapted to be arranged beneath one of the wheels to be aligned when the same is in a raised position, said unit comprising a base, and an elongated member pivoted to the base for horizontal swinging movement thereon, and having a part removed longitudinally of the member from the axis of the latter, and adapted to frictionally engage the vehicle wheel, whereby, when the wheel is revolved, the member will be turned, so that its longitudinal axis will be parallel to the medial plane of the wheel.

7. In a wheel-aligning device of the class described, the combination of a horizontally swinging indicator arm, means for supporting said arm beneath a wheel to be aligned, yieldable means constantly urging the indicator arm upwardly to the wheel, and means on said arm for frictionally engaging the wheel at one side of the pivot of the indicator arm whereby when the wheel is revolved the indicator arm will be turned and its longitudinal axis disposed parallel with the medial plane of the wheel.

8. In a wheel-aligning device of the class described, the combination of a horizontally swinging indicator arm, means for supporting said arm beneath a wheel to be aligned, means on said arm for frictionally engaging the wheel at one side of the pivot of the indicator arm whereby when the wheel is revolved the indicator arm will be turned and its longitudinal axis disposed parallel with the medial plane of the wheel, and means rising at the opposite side of the pivot of the indicator arm to engage the spindle knuckle of the axle carrying the wheel whereby the pivot of the indicator arm will be located directly beneath the steering axis of the wheel, said locating means being movable with the arm into operative relation to the wheel.

9. In a wheel-aligning device of the class described, the combination of a horizontally swinging indicator arm, means for supporting said arm beneath a wheel to be aligned, means on said arm for frictionally engaging the wheel at one side of the pivot of the indicator arm whereby when the wheel is revolved the indicator arm will be turned and its longitudinal axis disposed parallel with the medial plane of the wheel, a vertically adjustable supporting device disposed at the opposite side of the pivot of the indicator arm movable with the arm into operative relation to the wheel, and a feeler tip at the upper end of said device to bear against the spindle knuckle of the axle carrying the wheel to be aligned whereby the pivot of the arm will be located directly beneath the steering axis of the wheel.

10. In a wheel-aligning device of the class described, the combination of a horizontally swinging indicator arm, means for supporting said arm beneath a wheel to be aligned, means on said arm for frictionally engaging the wheel at one side of the pivot of the indicator arm whereby when the wheel is revolved the indicator arm will be turned and its longitudinal axis disposed parallel with the medial plane of the wheel, a supporting member rising above the indicator arm at the opposite side of the pivot thereof and movable with the arm into operative relation to the wheel, and a feeler tip rotatably and slidably mounted on the upper end of said supporting member to bear against the spindle knuckle of the axle carrying the wheel whereby the pivot of the indicator arm will be located directly below the steering axis of the wheel.

11. A machine for determining the misalignment of vehicle wheels comprising two members for engagement by two wheels whose misalignment is to be tested, each of said members having its wheel engaged portion movable in the direction of travel of the vehicle and at least one of said members being movable transversely of said direction, means for supporting said movable members, positioning means for cooperating with two spaced points arranged transversely of the vehicle in order to relatively position the vehicle and the machine so that the axle of the vehicle lies exactly at right angles to said direction while the wheels are in engagement with said members, and means for supporting said positioning means in fixed position to the supporting means of the movable members.

12. A machine for determining the misalignment of the wheels of a vehicle comprising two movable members for engagement by two wheels whose misalignment is to be tested, each of said members having its wheel engaged portion movable in the direction of travel of the vehicle and at least one of said members being movable transversely of such direction, means for supporting said members, positioning devices for cooperating with two spaced points arranged transversely of the vehicle, and adjustable means supporting said positioning devices from the member supporting means to permit the positioning devices to obtain universal adjustment in a vertical plane extending transversely of said direction.

13. A machine for determining the misalignment of the wheels of a vehicle comprising two members for engagement by two wheels whose misalignment is to be tested, each of said members being movable in the direction of travel of the vehicle and at least one of said members being movable transversely of said direction, means for supporting said members, positioning devices for cooperating with two spaced points arranged transversely of the vehicle, adjustable means supporting said positioning devices from said member supporting means to permit the positioning devices to obtain universal adjustment in a vertical plane extending transversely of said direction, said adjustable means comprising a standard on the member supporting means, a frame supporting one of the positioning devices, and a link connecting said frame and the standard.

In testimony whereof I affix my signature.
FRANK W. HOWE.